United States Patent [19]

Ditzik

[11] 4,422,732
[45] Dec. 27, 1983

[54] BEAM ADDRESSED ELECTROOPTIC DISPLAY SYSTEM

[76] Inventor: Richard J. Ditzik, 9838C Appletree Dr., San Diego, Calif. 92124

[21] Appl. No.: 271,692

[22] Filed: Jun. 8, 1981

[51] Int. Cl.³ .............................................. G02F 1/03
[52] U.S. Cl. .............................. 350/356; 350/96.29; 350/96.14; 29/592 R
[58] Field of Search ............... 350/353, 351, 337, 336, 350/334, 356, 96.29, 96.14; 29/592 R

[56] References Cited

U.S. PATENT DOCUMENTS 3,817,597 6/1974 Aleksoff .............................. 350/356
4,236,784 12/1980 Palmer .............................. 350/96.29

Primary Examiner—James W. Davie
Assistant Examiner—Léon Scott, Jr.
Attorney, Agent, or Firm—Thomas J. Tighe

[57] ABSTRACT

A display system utilizing a cross-sectionally shaped beam and electric signal to create a desired form by changing the optical characteristics of an electrooptic material. The beam is used to either raise the temperature of a blocking layer adjacent to the electrooptic material and thereby raise the temperature of the material in an area defined by the cross-sectional area of the beam, or it is used to create an electric potential by means of a photoconductor layer adjacent to the electrooptic material, the area of the electric potential being nearly identical to the cross-sectional area of the beam. The beam can be shaped by a template. The beam is directed across the surface of the display panel by means of an X-Y deflecting scanner. A method of manufacturing the display panel using Fezeau fringes is also presented.

7 Claims, 6 Drawing Figures

BEAM ADDRESSED ELECTROOPTIC DISPLAY SYSTEM

BACKGROUND OF THE INVENTION

This invention relates generally to electrooptic display (EOD) systems and display systems wherein the characters are formed by action of a light or laser beam.

The prior art in liquid crystal displays (LCD's) has been segment- or matrix-addressed, using a wide variety of line, multiplexing and drive circuit techniques. A few light energy addressed LCD's have been reported and are of two general types: image addressed and laser beam addressed displays. In both of these type displays, the liquid crystal (LC) cell or panel is not viewed directly but is optically projected onto a screen. The LC cell and projection optics can be either a reflective type or transmissive type. In the reflective types, a light source in the form of a desired image is focused onto the rear side of an LC cell where the image falls on a photoconductor coating and an absorbing layer which prevents any light from passing from the rear to front of the cell. The LC material in that portion of the cell receiving the image changes from a clear state to a scattered, and therefore, opaque state. A reflective coating is placed behind the LC material, so that projection light from a source in front of the cell is reflected forward to projection optics and to a display screen. The transmissive type of LCD has an LC cell without absorbing or reflecting layers, so that writing light entering from the rear is passed through the cell. The scattered regions of the LC material blocks the light and the image appears black when projected to a screen.

Each of the above prior arts suffer from several difficulties which, to date, have prevented them from becoming a practical display device. The matrix addressed displays are very difficult to build in large sizes (i.e., larger than 4 inches square), and they are restricted to low display resolution, since the resolution is controlled by the number of X and Y lines per unit area and the necessity of connecting each of the lines to a drive circuit. The image addressed LCD's reported have the disadvantage of requiring an expensive cathode ray tube (CRT) to provide an image to the LC cell. The laser addressed LCD's reported have the following disadvantages: (1) they require high intensity light source and optics to project the LCD image to a screen; (2) their LC cells are small requiring high magnification; (3) the space taken up by the display apparatus is large because of the long optical path required; (4) light loss occurs during projection and results in low contrast; and (5) their displays tend to wash-out in a high ambient light environment.

The invention claimed here has the inherent advantages of being a direct view (i.e., no projection optics), low profile display device having an optimized viewing angle. The display panel can be arranged to have a viewing angle less that 90° from horizontal which is an improvement with respect to human factors over conventional display monitors. Since the display panel is inclined, the overall height of the display system and enclosure is reduced. The compactness of the device lends itself to portability. The display device described by this invention could be a suitcase portable display monitor or terminal. Another advantage of this invention is that the display panel is flat, even for large sizes, unlike CRT's which are curved. Finally, the low profile, inclined display panel is ideal for use with transparent graphic stylus or pen tablets or touch panels (i.e., light pen mode).

The prior art with respect to LC display cell or panel construction shows us methods used to build a liquid crystal electrode sandwich. A typical LC cell is comprised of a first glass sheet coated with an indium tin oxide layer for the bottom electrode, a thin ½ mil MYLAR or TELDAR spacer around the perimeter of the viewing area, a thin liquid crystal compound layer of 10–15 microns thick, and a second glass sheet also with an indium tin oxide coating. The perimeter is typically sealed with a glass frit. Prior to sealing and liquid crystal injection, the surfaces of one or both of the electrodes are usually cleaned and treated to facilitate the long rod-like liquid crystal molecules in aligning either parallel or normal to the cell walls. The prior art covers several surface alignment techniques which is well known to those skilled in the art. All liquid crystal cells or panels of the prior art are relatively small in viewing area because of the difficulty in maintaining the thin 10–15 micron gap between the glass sheets over the entire cell area. Most cells are less than 2 inches square. The largest prior art liquid crystal panel reported is a circular 6 inch diameter cell. However, the realization of that cell was only possible after a very costly and time consuming fabrication process and is not appropriate for general purpose display device applications. The large area liquid crystal panel of this invention is capable of being manufactured in large quantities on a production basis. The method of this invention enables the fabrication of panels up to a size of 121 square inches or larger, depending on manufacturing techniques and physical constraints. In addition, these large panels are capable of being viewed directly by an individual with or without image projection. The advantages of direct view over projection have been stated above; however, even if a projection method is used for a particular application, the larger LC panel will mean a lower magnification, a shorter optical path, and a smaller device enclosure.

Prior art in the field of character generation for laser beam addressed liquid crystal displays have been reported by (1) D. Maydan, et al, ("IEEE Conference Record" of 1972 Conference on Display Devices) with combination of a $TeO_2$ acoustic-optic deflector and a galvometer scanner; and (2) A. B. Dewey, et al, (Proceedings of the SID, Vol. 19, No. 1, 1st Quarter, 1978) with a pair of galvo scanners. In each technique, alphanumeric characters are formed by a raster scan method using a modulated laser beam to form the desired characters. These methods have several disadvantages. First, the characters are formed by a dot pattern; thus the characters are not distinct or clearly formed, especially if the character dot matrix is less than 7×9. If the matrix size is increased, readability is improved, but the character write rate is reduced because more scans are required per character. The write rates using this method on large panels are relatively slow. Finally, the scanners and/or deflectors required to scan the small rasters, must be highly accurate and fast (high frequency response), which means they are very costly. The laser beam shaping aperture character generator of this invention has the following advantages. The alphanumeric characters formed by the laser beam will be much sharper and more well defined than dot matrix characters which greatly improves the readability of the text displayed on the screen. Secondly, the aperture plate or template can be removable, providing means for user-changeable-character sets for displaying characters of different languages or displaying special characters. Another advantage of this character generator when used with EOD's is that it provides faster character write rates than the dot matrix technique. This is especially desirable in LCD's because of the relatively slow response of the liquid crystal material. Finally, the aperture plate provides a simple means of producing a plurality of beam diameters which can be used to produce several different line widths on the display panel in order to convey information emphasis and graphics.

The prior art involved with laser scanners show us a diversity of electro-mechanical, acousto-optical, electrooptic, and refraction defices and techniques. Only electro-mechanical devices show any promise of providing large angle (greater than $+/-30°$) deflection required in direct view displays. There are several electro-mechanical scanners available: galvonometer-mirror, piezo-electric fiber, torsion bar, and rotating polygon devices. The best of the prior art scanners, which satisfies the normal display requirements of large angle deflection, analog responses, good linearity, broad band frequency response, and non-periodic wave pattern capability, is the galvo-scanner. For X and Y deflection, two galvo-mirror scanners, a 90° mirror, and a mounting frame are usually required. The magnetic fiber optic laser beam scanner of this invention has several important advantages over the galvo-mirror and other prior art scanners. The fiber optic scanner is an inherently simpler device having only one moving part as opposed to two for the galvo-mirror scanner. The less complicated construction will result in a lower cost and a more reliable device. The fiber optic element can be made very small, so that the mechanical response and dynamic performance (lower inertia) is better than the galvo device, resulting in a frequency response that is moderate to high. Another advantage of the fiber optic scanner is the capability of wider angle deflections of greater than $\pm 60°$. The overall size of the device is smaller in both mass and volume, which is a great advantage in many applications. Finally, an important advantage over the galvo-mirror scanners is the elimination of mirror alignment problems which effects the mechanical design.

Various absorbing layers or photoconductor coatings have been reported in the field of image addressed LC cells, all of which were intended for reflective types LC light valves. Although they absorb most of the laser energy, 65%–98% depending on the type, some of the laser energy still passes through the cell. E. A. Cunningham, et al., (IBM Technical Disclosure Bulletins, Vol. 18, No. 11, April 1976) reports three types of absorbers: (1) antireflection coatings ZnS and MqF; (2) a thin layer of germamium; (3) a layer of polymer doped with a dye matched to the laser. T. D. Beard, et al., (Applied Physics Letters, Vol. 22, No. 3, Feb. 1, 1973) uses CdS photoconductor with a CdTe layer to block any residue light getting through to the photoconductor. When a laser beam is applied to an absorbing layer, a localized heating takes place. It has been shown that when an absorbing layer of photoconductor coating is placed at or near an LC material, the molecular phase of the LC material is locally changed by the application of the light source. There are several advantages of the opaque absorbing layer of this invention when the layer is placed between the LC material and the rear transparent electrode. The most important advantage is that this layer will block 100% of the energy from the laser beam and thereby eliminate any laser safety problems. Because of the two states of the LC material, either milky white (scattered molecules) or transparent (aligned molecules), a black-on-white background or white-on-black background display is possible by making the color of the opaque absorbing layer black. With the black-on-white display, which is the preferred embodiment, normal ambient room light would be sufficient to produce a high-contrast display. Also, a black-on-white display would reduce the annoyance of reflective glare off of the display screen. This is especially important if the screen angle is inclined because it will tend to reflect ceiling lights. Finally, this layer is adaptable to being edge-lighted around the perimeter such that the scattered LC molecules will propagate the light over the entire display background.

Other attributes and advantages inherent in the system herein disclosed will be readily apparent to one of ordinary skill in the art.

SUMMARY

This invention presents a "folded optics" display system for displaying alphanumeric characters and graphics. The medium of display is electrooptic (EO) material. The characters are addressed and written by an optical beam such as a laser. The optical beam causes the EO material to become opaque by one of two processes, localized heating or increased localized electric field.

In the preferred embodiment a beam shaping aperture is used to cause the beam cross-sectionally to take the shape of the desired character. The beam diameter may then be expanded by a beam expander. A wide angle scanner is used to direct the beam in X, Y fashion across the rear of the display panel to write the characters. The characters are erased by an alternating voltage source.

It is an object of this invention to provide large area electrooptic display panels capable of being manufactured in large quantities on a production basis. It is a further object of this invention to utilize said panels in an optical beam addressed display system.

It is an object of this invention to provide an optical beam addressed electrooptic display system which is low in profile and compact in size and which has an inclined viewing screen.

It is an object of this invention to provide a scanner means for directing an optical beam in an X, Y fashion which has increased dynamic response over those presently available. It is a further object of this invention to utilize said scanner means in an optical beam addressed display system.

Other objects of this invention are set forth hereinafter.

DESCRIPTION OF PREFERRED EMBODIMENT

Figure 2:
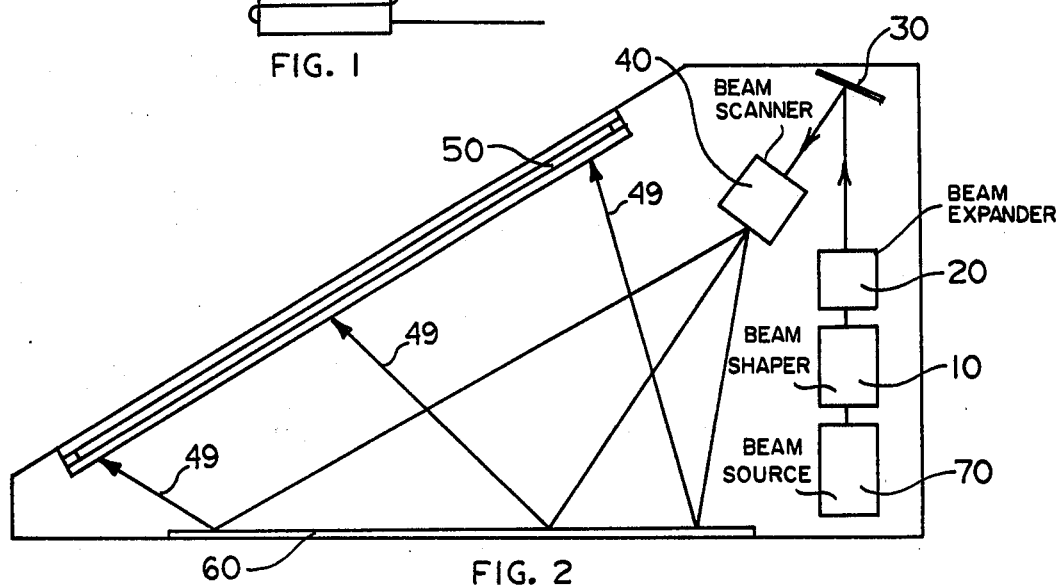
FIG. 2 is a diagrammatical view of the optical beam addressed electrooptic display system.

The major components of the system, referring to FIG. 2, are a low power laser character generator 10, beam expander 20, 45 degree mirror 30, wide angle scanner 40, large area mirror 60, laser 70, and electrooptic display panel 50.

The laser 70 can be any one of several low power semiconductor types, such as 1.06 μm Yttrium aluminum garnet (YAlG), a 1.06 um neodymium yttrium aluminum garnet (Nd-YAlG), Gallium Arsenide (GaAs) lasers, or gas lasers such as a 1.15 um Helium-Neon (HeNe). The lasers should be continuous wave rather than pulsed and may be less than 50 mw in power. HeNe lasers can be as low as 1 nw. In one embodiment of the invention the laser beam need not be modulated, if a certain type of smectic LC material is used with controlled surface conditions and applied ac voltage. If other electrooptic materials are used, modulation may be accomplished by placing a laser beam modulator directly in the path of the beam or for some types of lasers the power of the laser itself may be modulated. The laser will require a power supply.

The character generator is preferably an optical beam shaping aperture as described herein. The characters may also be generated by scribing them out using the wide angle scanner 40. A conventional raster scan, dot matrix technique may also be used.

A beam expander 20, may be required to increase the beam diameter. The expander may be placed in several different positions in the optical path depending on the laser output beam diameter, type of character generator used, and type of scanner used.

The wide angle scanner 40, may also be accomplished by several different means. The preferred means is a magnetic field driven, ferromagnetic clad fiber optic laser scanner described herein. The scanning means could also be a pair of conventional galvenometer-mirror scanners arranged for analog X, Y angular deflection. Another scanning means uses a pair of standard rotating polygon faceted mirrors. In addition, there are several other methods to scan optical beams which are well known to those skilled in the art.

As shown in FIG. 2, the invention employs a technique referred to as "folded optics" in order to have an inclined display panel 50, typically 30 degrees from the horizontal. The term "folded optics" in this specification refers to the reflection off the large area mirror 60 of the shaped and expanded beam emitting from and directed by the beam scanning means 40. There are three primary reasons why the display panel 50 is inclined. First, it is contemplated that the invention can be used with a transparent graphic tablet or touch panel, (Not shown in the Figures), which can be placed over the surface of the display panel. Several types of graphic tablets are available which are capable of digitally encoding the path of a hand-held stylus or pen moving over the tablet area. Mating such a tablet with an inclined display panel creates a comfortable man-machine interface for freehand writing and sketching. Secondly, human factor studies have shown that the display of text and graphic information has optimum viewing characteristics at screen angles of 30-45 degrees. Finally, it permits the invention to be made compact and portable, capable of being placed into and carried about in a standard size suitcase.

Figure 5:
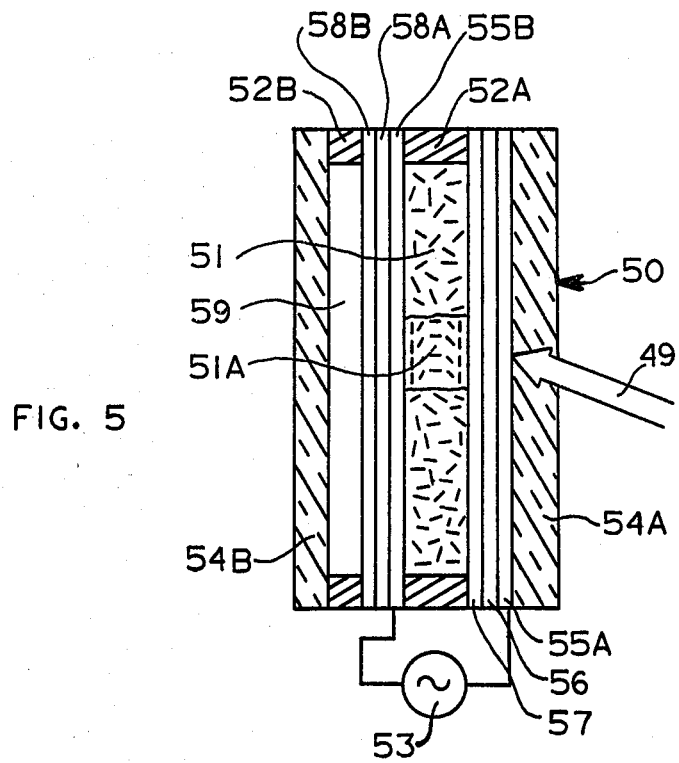
FIG. 5 is a representative expanded cross section of an LC display panel.

The active non-emissive electrooptic material 51 used in display panel 50 shown in FIGS. 2 and 5 could be one of several different types of compounds. The term electrooptic means that an optical change is caused by electrical means. However, some electrooptic materials, particularly certain types of liquid crystal materials, change optical state 51A by localized heating, e.g., from a laser beam 49, and can be erased by an applied alternating current means 53. Such materials can be called electrothermal-optic, but here, they are considered a sub-category of electrooptic materials. Two other types of electrooptic materials, which may be employed in this invention, are electrochromic (EC) and electrochemichromic (ECC) materials. Definitions of each type are given in the paragraphs below. Although EC, ECC, and certain types of liquid crystal materials do not respond directly to optical beams, display addressing by optical means can, nevertheless, be accomplished by employing a photoconductor layer between the electrooptic material and the electrode layers. When the photoconductor is addressed by a concentrated optical beam such as a laser, it will cause a localized electric field increase causing the electrooptic material to respond. This embodiment is discussed in greater detail in a later section.

In the preferred embodiment of the display panel 50, the optical state of the LC material 51, is changed by the heating process of a laser beam 49. The write and erasing characteristics are controlled by an alternating voltage. Thus the liquid crystal material is both electrooptic and thermooptic at the same time, i.e., electrothermo-optic. Several types of liquid crystal compounds having these characteristics have been reported and are discussed in more detail in the next section. Of the three classes of liquid crystals: Nematic, cholesteric, and smectic, the latter has the best properties for utilizing the electrothermo-optic effect. Desirable characteristics of such a display are selective write, selective erase, long-term display storage (memory), bulk erase, self-modulation, continous grey scale, high resolution, and a black-on-white picture. In another embodiment, nematic-cholesteric liquid crystal mixtures may be utilized. The characteristics of this material are similar to the smectic type except that it does not have selective erase, grey scale, or self-modulation properties. Another liquid crystal embodiment may be a electrooptic type material without thermooptic characteristics, which is placed in a panel having a photoconductor layer.

The liquid crystal panel 50 is comprised of a sandwich of several layers and coatings. The outside layers are the front 54B and rear 54A substrates of fused silica or quartz glass, the front substrate 54B being 0.125 to 0.250 inches thick. The inside surface of the rear substrate 54A should be polished to be optically flat. A rear transparent conductive coating, the rear electrode 55A, is applied to the inside surface of the rear substrate 54A. An optional photoconductor layer 56 may be included if certain previously discussed liquid crystals are used. The liquid crystal material 51 is situated between an optical blocking layer 57 and a front transparent conductive coating, the front electrode 55B. The purpose of the block layer 57 is to prevent the laser beam from passing through the display panel 50 and causing injury to the eyes of a viewer. Therefore, the blocking layer must block substantially 100% of the laser beam light. The electrodes, 55A and 55B, are coatings of a mixture of indium and tin oxide (ITO), with a sheet resistance of 100–500 ohms per square inch. Preferably, the blocking layer 57 and photoconductor 56 may be combined into one layer performing both functions.

The thickness of the liquid crystal material 51 is typically 12–14 um depending on the material. Although a 2–3 mil thick liquid crystal panel has been reported, most prior art panels range from 10–20 um. Spacers 52A are required to separate the blocking layer 57 and the front electrode 55B. The spacer should be a relatively inert organic material such as Teflon or Mylar placed around the perimeter of the viewing area. An alternate means may be a glass frit.

The liquid crystal material 51 can be smectic type A or cholesteric compounds, where the former is the preferred. Examples of smectic liquid crystals which have a electrothermooptic effect are N-(p-cyanobenzylidene)-p-n-octylaniline (CBOA), cyano-octyl 4-4' biphenyl (COB) having a molecular structure:

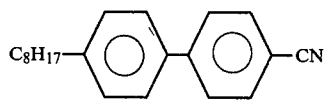

or para' cyano biphenyle-nonanoate:

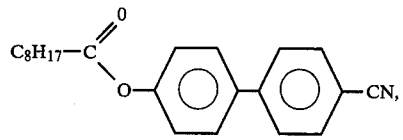

a mixture of 59 wt% methoxybenzalidene-butylnailine (MBBA) −41 wt% pentyl-cyanosiphenyl (PCB), or octylcyano-biphenyla (OCB). Each of the above smectic liquid crystals have a positive dielectric anistrophy. An example of cholesteric material is 90% MBBA [N-(p-methoxybenzylidene)-p-n-butylaniline] with 10% CN (Cholesteryl nonanoate), having a negative dielectric anistrophy.

In practice, it is virtually impossible to fabricate liquid crystal panel cells larger than six inches in diameter with such a small gap between two glass substrates. Therefore, it is necessary to construct a panel as shown in FIG. 5, with only one thick rigid substrate and a plurality of optically clear, thin flexible membranes. In the embodiment shown, the front electrode 55B is not coated onto a thick glass substrate, as on other known LC panels, but rather it is deposited on an optically clear 2–5 mil polyester film 58A. This film 58A, is placed over the liquid crystal layer 51 to form the cell. Indium-tin oxide coated polyester membranes are available in thickness 3–7 mils from Seirracin Incorporated, under the INTREX product name. An alternate transparent membrane could be ITO coated Corning MICROSHEET glass. The purpose of the thin transparent flexible membrane 58A is that it can be sandwiched into place in such a manner as to follow the irregularities of the rear electrode-substrate surface. This produces a relatively constant thickness LC layer, over large areas. Thus, it is possible to build liquid crystal panels that are many times larger than previously realized. To provide some rigidity to the membrane 58A, another polyester of MICROSHEET membrane 58B, is bonded to the first membrane 58A with an optically clear epoxy glue. When the epoxy cures, the two films will be relatively rigid and the LC layer thickness will be held constant.

The epoxy glue to be employed can be the same type used to bond faceplates to CRT screens. To further protect the liquid crystal cell, the front substrate 54B is placed over the LC sandwich separated by perimeter spacers 52B, creating an air gap 59. Although the air gap 59 is kept to a minimum, it shall be large enough to clear all dimensional irregularities of the film layers 58A and 58B. Since moisture reacts with liquid crystal compounds, a suitably hermetic water tight seal is necessary around the perimeter of the panel 50. Standard seals, such as glass frits, solder glasses, or polymeric materials can be employed. Preferably the panel spacer and seal may be combined into one element performing both functions.

LC characteristics such as contrast, writing energy, and storage properties are highly dependent on the type of surface alignment given to the cell walls. Surface alignment techniques provide the liquid crystal with an optically clear, uniform molecular orientation, either parallel (homogenous) or normal (homeotropic) to the cell walls. There are many methods known to those skilled in the art to obtain this surface alignment. One method of obtaining this condition is to coat one or both cell surfaces with silane coupling agents, such as those in the general form $RSi(OCH_3)_3$. In particular N-dimethyl-n-octadicyl-3-aminopropyl-trimethoxysilychloride (Dow-Corning XZ-2-2300) has been used successfully to align CBOA liquid crystal molecules normal to the substrate surfaces, providing a homeotropic orientation. The method used is to heat the XZ-2-2300 aligned cell to its isotropic phase and slowly cool it back to the smectic phase.

Hareng and LeBerre (Electronics Letters, Vol. II, No. 4, Feb. 20, 1975) have reported a similar silane aligned COB cell, cooling from isotropic to smectic phase with an alternating voltage applied to the electrodes. The application of the alternating voltage during initial cell cooling is known as poling. It is believed, that elastic energy stored during the poling process is beneficial in the formation of local LC molecular disorders during laser writing. Dewey, et al., (Supra) has reported cell sensitivities for both parallel and normal alignment of an OCB-type liquid crystal. Their data shows that less writing energy is required when the molecules are aligned parallel to the rear cell surface, ie.e, the laser heated side. Furthermore, they found that the alignment, normal or parallel, at the cool surface is not important due to temperature gradients existing throughout the LC thickness.

In FIG. 5, the LC material 51, is shown in a highly scattered state, appearing as milky white, except for region 51A which is in an ordered, clear state. In the preferred embodiment, the display panel screen background should appear white, and the written information appear black. This is accomplished by selecting the blocking layer with a black color. The layer is visible to the user because the written area 51A is optically clear. The white background of the panel 50 is initially created by heating the LC material to its isotropic phase cand cooling it rapidly to is smectic A phase, where highly scattered texture of focal conic domains exist throughout. The panel 50 remains in that state until it is assembled into the display system enclosure and a write operation takes place.

In order for the write operation to take place, the LC material 51 is heated to a few degrees below the transition point where it begins to change from a smectic A phase to a nematic phase. The heating may be accomplished by a conventional surface area heater which is temperature compensated. A character is written by directing the laser beam 49 at a selected point on the back of the panel 50. The blocking layer 57 absorbs most of the beam 49 energy and becomes heated at the point of incidence. The rise in heat is transferred through the blocking layer 57 to the LC material 51. Coincident with the beam being applied to the panel, a 5 KHz alternating voltage is applied to the electrodes 55A and 55B. A voltage level of 5–15$_v$ RMS causes a reduced degree of scattering proportional to the voltage level and at 15$_v$ RMS the portion of the LC material heated by the beam 49 becomes homeotropic, that is transparent. After the beam is withdrawn the affected region remains homeotropic until it is erased, therefore, no character refresh process is necessary. Note also that no external laser modulator is required. Total full screen erase is accomplished by applying a 5 KHz, 0–5 V RMS voltage to the electrodes coincident with an application of heat to the entire panel by the area heater or a current until it reaches the isotropic phase, followed by a rapid cooling caused by removal of the heat causing a return to the smectic phase. Selective erase is achieved by an application of 0–5 V RMS coincident with the application of the laser beam to a selected area, causing the area to be heated to the isotropic phase, and by rapid cooling after the beam is removed. When selective erasure is to occur, a wider diameter laser beam is optically obtained to improve the selective erase scan. The write and erase operation of the liquid crystal panel involves both laser and electrical energy sources; therefore, the type of display can be referred to as electrothermo-optic.

In addition to liquid crystal materials, other non-emissive electrooptic materials can be employed in the display panel 50. Materials having properties of electrochromism show a reversible color change induced by an applied electric field or current. Many physical phenomena cause these reversible color changes and they can occur in several organic or inorganic materials. The physical mechanisms that cause these phenomena can be different, but, they may be identified by two categories: electronic and electrochemical, (I. F. Chang and W. E. Howard, IEEE Transactions on Electron Devices, Vo. ED-22, No. 9, September 1975, pp. 749–758). Like liquid crystals, the optical response of EC materials are non-emissive or passive, i.e., they do not emit light. Several different physical mechanisms occur in a wide variety of organic and inorganic materials, which may be in liquid or solid states. The most promising materials for display application are a solid electrochromic WO$_3$ thin film or several liquid EC systems. Chang and Howard (Supra) have identified four types of liquid EC systems, which could be employed in display devices. Type 1 is simple redox electrochemical reaction which is described by A±ne→B (colored species). Many chemicals in aqueous or monaqueous solutions show this effect; one example is polytungstin anions (PTA) in aqueous solutions. Type 2 is a redox reaction coupled with an independent chemical reaction resulting in variable persistence. An example is PTA combined with an oxidizing agent H$_2$O. Type 3 is a redox reaction coupled with a chemical reaction, giving an insoluble colored species. An example is viologen bromide, which after electrochemical reduction forms heptyl viologen bromide (HVB), an insoluble purple compound on the cathode. Type 4 is redox reaction where a WO$_3$ solid film forms one electrode and is reduced, becoming colored a dark blue. Best display contrasts can be obtained with Type 4 electrochemical reductions. Although EC cells are very similar to the liquid crystal cells, the former will be easier to manufacture because cell spacing is not as critical having typical spacing of 0.5 to 2 mm.

The fabrication of low cost large viewing area LC and EC panel cells has heretofore been virtually unrealizable. Whether the materials are liquid or solid, a thin layer of electrooptic material must be placed between two substrates, and its thickness controlled over the entire panel area. This is more of a problem if the material is liquid; therefore, the discussion will assume a liquid material. In order to build large area panels, a manufacturing apparatus 80 has been designed to perform interferometric flatness measurements during the fabrication, FIG. 6. The panel construction described below will insure a relatively constant electrooptic material thickness throughout the panel. Consistent thickness is critical for consistent display performance.

Figure 6:
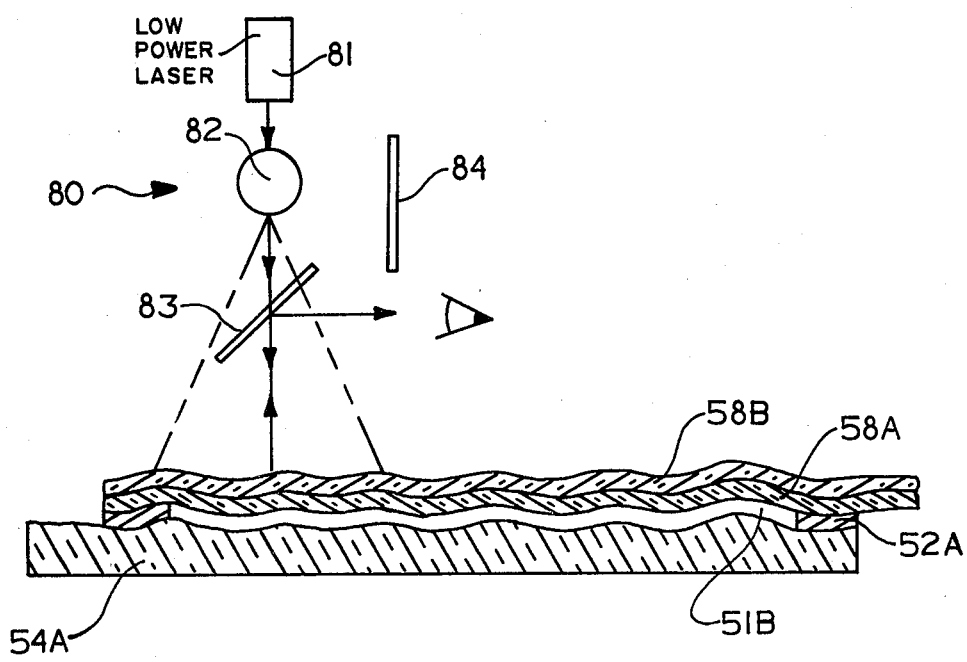
FIG. 6 is a representative expanded cross section of an LC display panel showing the technique used in manufacturing the panel.

Before the electrooptic material is injected into the cell, the panel is placed under the apparatus 80 as shown in FIG. 6. For simplicity, the electrodes, photoconductor, and blocking layer, are not shown. The thin flexible polyester or glass membrane 58A, with the electrode 58B coated on the bottom side, is placed on the perimeter spacers 52A. As shown in FIG. 6, the cell layers are displaced with respect to each other in order to facilitate electrical connections to the electrodes. An air space 51B is where the electrooptic liquid is injected through one or more filler holes (not shown in the Figure). Alternate injection techniques such as applying the material before the membrane may be possible. Surface tension of the liquid will help distribute itself throughout the area and tend to prevent the electrodes from shorting. As discussed previously, another transparent polyester or glass membrane 58B with optical epoxy glue on the bottom side is placed on top of the previous membrane. Before the epoxy cures, the membrane layer should be smoothed by hand or other mechanical means to remove air bubbles from the glue and electrooptic liquid. Removal of air bubbles can be further facilitated by placing the panel in a partial vacuum.

The panel is placed under a low power laser 81 directed normal to the panel surface. An optical diffuser 82 is used to diffuse the laser beam (shown by dotted lines) over a large area of the panel. A conventional beam splitter 83, which transmits light passing in one direction (from the laser), but which reflects light 90 degrees entering from the opposite direction (from the panel surface) is used to enable an operator to view the laser light being reflected from the panel. If the thickness of the electrooptic layer is greater than a few wavelengths of light, then the person looking in the direction as shown in FIG. 6 will observe constructive and destructive interference lines or fringes, called Fezeau fringes. The electrooptic material must be in an optically clear state. The observed lines of maximum and minimum intensity are interference fringes of constant thickness. A black shielding screen 84 is mounted just above the line of sight of the observer, to block the unreflected light from the diffuser 82.

While the epoxy glue between the membranes 58A and 58B is curing, the membranes are smoothed and forced to follow the slight irregularities of the bottom substrate. The smoothing is accomplished while the Fezeau fringes are being observed. The membranes are forced to follow the "hills and valleys" of the substrate 54A to insure that the electrooptic layer is kept constant. Typical liquid crystal panels require a 12-14 um thick LC layer. The membrane can be forced into the desired position by small weights or other force means. The membrane smoothing will continue until the observed regular or irregular Fezeau fringes disappear. Before the epoxy is cured, this procedure can be repeated with a multiplicity of laser wavelengths. After the epoxy is hardened the two membranes will become rigid, fixing the constant electrooptic layer, and the weights or forces can be removed. The curing time of the optical epoxy can be selected to facilitate the panel manufacture. The apparatus should be arranged so that the laser diffuser and beam splitter can be moved with respect to the panel, in order for the entire panel to be observed.

Since most electrooptic materials either do not respond to light (such as EC materials) or respond faster to electrical addressing than temperature (such as some smectic LC materials, a photoconductor material may be used to transform the optical light beam energy to electric field energy. In such a case, a photoconductor layer 56 is inserted into the panel 50 as shown in FIG. 5. The conductivity persistence of the photoconductor must be long enough for the electrooptic material to respond. Possible photoconductors include CdS, selenium films, or glow discharge produced amorphous Si. The properties of photoconductor must be matched to the type of electrooptic material and display application. Using certain photoconductors may require a light blocking layer to block ambient light from the front of the panel passing through the cell and effecting the photoconductor. One example of the blocking layer is CdTe. When an optical beam, such as from a low power laser, impinges on the rear electrode, it is passed to the photoconductor. At the same time there is a voltage applied across the two electrodes. The resistance of the photoconductor is greatly reduced at a small localized region (addressed by laser beam), thereby increasing the electric field between the electrodes in this localized area. If a blocking layer is employed, it must not modify or alter the electric field, which passes through it. The color of the blocking layer or photoconductor is very important, since one optical state of most electrooptical materials is clear. Therefore, the color of the layer should be chosen to give display contrast with the other optical state.

Figure 1:
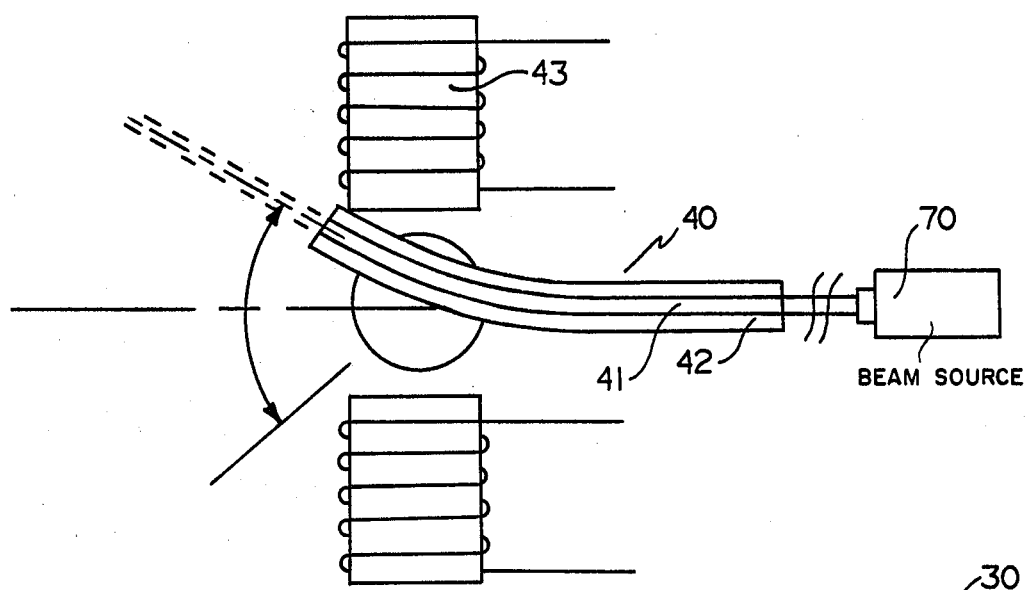
FIG. 1 is a diagrammatical view of the wide angle scanner.

The preferred embodiment of a device to scan or deflect an optical beam over the electrooptic display area is shown in FIG. 1. The device is a magnetic field driven ferromagnetic clad fiber optic scanner 40. Altough the fiber optic scanner is designed for an electrooptic display, it could be employed in other applications, such as laser printing, non-coherent light scanners, holography, laser machining/drilling/atmospheric measurements, laser graphic arts, or light show entertainment.

As shown in FIG. 1 a light source, such as a low power laser 70 feeds a fiber optic core 41 by well known laser to fiber coupling techniques. The fiber optic core 41 which can be a single glass strand or a bundle of strands, is covered by a flexible thermoplastic-ferrite composite jacket 42. This thermoplastic jacket 42 can be extruded along with the fiber optic core or manufactured separately in a tubular shape. In the latter case the core is slipped through the thermoplastic jacket and bonded to it. The thermoplastic ferrite composite material can be obtained from General Tire and Rubber, Industrial Products Division, under the GEN-MAG product name. Since the fiber optic jacket 42 is ferromagnetic, it can be deflected by attractive or repulsive magnetic forces from one or more magnets. In the preferred embodiment, a minimum of four solenoid electromagnets 43, spaced symmetrically about the fiber optic 41, deflect the fiber. The laser beam, exiting from the glass fiber 41, is deflected or scanned through an angle $\pm\theta$. The application of current in any one or more adjacent solenoids 43 controls the X and Y deflection of the fiber element, where $\theta$ is proportional to the current. During construction, the ferromagnetic jacket 42 is fabricated in an unpoled magnetic state. After the scanner is assembled, the device is cycled through a large number of deflections, in each direction. This will gradually order the magnetic domains of the ferrite composite material in a radial direction (i.e., the material is poled).

It is anticipated that deflection angles as large as $\pm60$ degrees will be possible with this device 40. A deflection of at least $\pm30$ degrees would be required for display applications.

The size of the fiber optic element 41 shall be determined by trading off several system considerations. Generally, the smaller the fiber optic element (i.e., its mass), the faster the deflection response will be, due to lower fiber element inertia. This also will result in smaller delay time and overshoot characteristics. Fiber optic glass strands can be made with diameters as small as 40 um. However, the smaller the fiber element diameter, the larger the optical beam expansion will be required to display scanned information. Formulas for magnetic field intensity, magnetic field strength, and magnetic forces of solenoids are well known to those skilled in the art; thus they will not be presented here.

Figure 3:
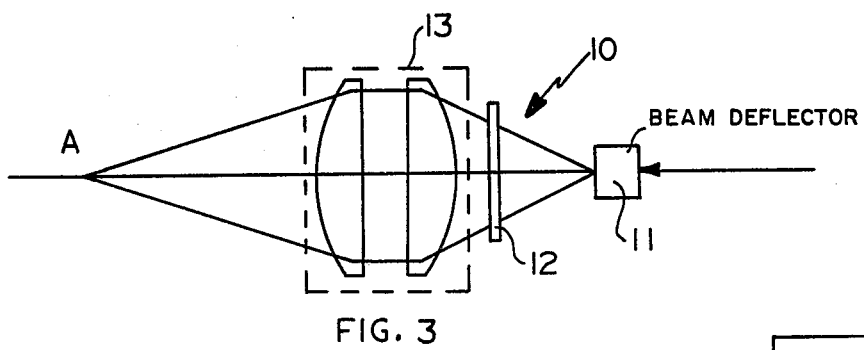
FIG. 3 is a diagrammatical view of the beam shaping character generator.
Figure 4:
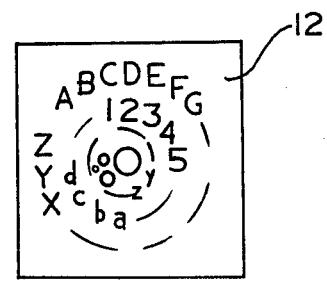
FIG. 4 is a front view of the character aperture template.

The optical beam addressed electrooptic display requires a character generation means. The device described herein is capable of generating any defined character by shaping the optical beam as it passes through an aperture or template. A simplified diagram of the character generator device 10 is shown in FIGS. 3 and 4. The laser beam enters a small angle deflector 11, which could be one of several types including acoustic-optic, piezoelectric or electrooptic deflectors. The preferred embodiments are the first and last of the above types, since there are no moving parts associated with them. The beam is deflected over a circular area in cone fashion. The beam impinges on an aperture template 12, which is a thin metal (or other material) plate that has a multiplicity of alphanumeric characters formed by openings through the template. Since it is desirable that deflections be restricted to small angles, the template diameter is small (about one inch). The distance between the two elements is adjusted accordingly.

After passing through the template, the character shaped beam enters an optical lens condenser 13, to refract the diverging beams back to point "A" on the center optical path. The lens condenser 13 can be constructed from a number of conventional spherical or cylindrical lenses, which first refract the divergent beams parallel and then converge the beams to a point. The point "A" is the entrance point of the wide angle scanner 40 or beam expander 20. There may be some slight dimensional distortion of some character shapes at the larger angle deflections, and the lens system may cause slight optical aberrations. However, these distortions will be very small and will not cause any display recognition or readability problems. Interference patterns or airy rings will not appear because the aperture openings will be very much greater than the wavelength of the time. Limit of resolution will be due to aberration errors of the lenses and to slight divergence of the laser beam.

Other characters and symbols can be etched from the template as well. As shown in FIG. 4, the central portion is reserved for circular apertures to shape a number of different beam diameters. These different beam diameters will provide the user with the capability to select several displayable spot sizes or line widths. One aperture diameter will be approximately 1.2–1.5 times the largest character height, so that the resulting beam can be employed as a selective erase beam. A mechanism (not shown in the figures) can be employed which enables the character aperture template to be easily removed and replaced with an alternate template. This would be a great advantage because the display could then be used for several different languages, or for special purpose symbols, such as encountered in mathematic or scientific applications.

The foregoing descriptions are intended to merely illustrate embodiments of the inventions claimed hereinafter and no unnecessary limitations should be derived therefrom.

I claim:

1. A method for manufacturing large area electrooptic displays which comprises:
    (a) placing a glass or transparent substrate on a work surface,
    (b) fixing spacers around the margins of the substrate,
    (c) fixing a first thin membrane to the spacers such that the first membrane is in spaced relationship to the substrate,
    (d) injecting an electrooptic material in a space between the first membrane and the substrate,
    (e) applying optically clear adhesive to an open surface of the first membrane,
    (f) laying a second thin membrane upon the adhesived surface of the first membrane,
    (g) from a suitable height above the second membrane, directing a low power laser beam normal to the work surface through an optical diffuser, through a conventional beam-splitter, and on to an exposed surface of the second membrane,
    (h) while the adhesive is curing, observing any Fezeau fringes and applying pressure normal to the exposed surface of the second membrane until said fringes disappear,
    (i) after the adhesive has set, fixing a protective transparent substrate in spaced relation to the second membrane.

2. A beam addressed electrooptic display device comprising:
    (a) a beam source for emitting a beam having a cross-sectional area,
    (b) means for shaping the cross-sectional area of the beam into any one of a set of display characters,
    (c) means for expanding the cross-sectional area of the shaped beam to a suitable size,
    (d) a first transparent substrate,
    (e) a second transparent substrate parallel to and spaced apart from the first substrate,
    (f) an electrooptic material sandwiched between the first and second substrates the combination forming an electro-optic panel, the electrooptic material being responsive to a simultaneous application of an electric signal across the electro optic material and impingement of the shaped and expanded beam upon the electro optic material and being operative to undergo a phase change in and through a portion of the electro optic material impinged upon,
    (g) a beam scanning means for receiving from a constant direction the shaped and expanded beam and redirecting said beam toward and over a suitable sized area on a surface of the electrooptic panel, the scanning means being responsive to electric control signals, and
    (h) a display control means for providing suitable electric signals across the electrooptic panel and for providing suitable electric control signals to the scanning means.

3. The display device of claim 2 wherein the electrooptic panel is inclined and further comprising a folded optics means.

4. The display device of claim 3 wherein the beam is an optical beam and further comprising:
    (a) at least one membrane interposed between the first substrate and the electrooptic material,
    (b) a first transparent electrode disposed between the membrane and the electrooptic material,
    (c) an optical blocking layer disposed between the second substrate and the electrooptic material, and
    (d) a second transparent electrode disposed between the optical blocking layer and the second substrate.

5. The display device of claim 4 or 1 wherein the beam scanning means comprises:
    (a) a light conductive fiber,
    (b) a ferromagnetic sleeving means for making said fiber deflectable via magnetic forces,
    (c) at least four electromagnets equally and radially spaced around the sleeved fiber such that magnetic forces of the electromagnets can deflect one end of the sleeved fiber in X-Y fashion.

6. The display of claim 4 wherein the optical beam is operationally directed to an exposed surface of the second substrate and further comprising a photoconductor layer sandwiched between the optical blocking layer and the second electrode, the photoconductor layer responsive to the optical beam and being operative to generate an electric potential across the electrooptic material over the an area of the photoconductor layer generally defined by the impinging beam.

7. The display device of claims 4 or 6 wherein the beam shaping means comprises:
    (a) a conventional small angle beam deflection means in electrical communication with the display control means,
    (b) a template means which defines a plurality of appertures in the shape of a set of display characters through any of which said apertures the beam can be directed by the deflection means, and
    (c) a optical condensor means to refract the shaped beam back to the original beam path.

* * * * *